(12) United States Patent
Kim et al.

(10) Patent No.: US 8,677,770 B2
(45) Date of Patent: Mar. 25, 2014

(54) SUPERCOOLING METHOD AND SUPERCOOLING APPARATUS

(75) Inventors: Su-Cheong Kim, Changwon-si (KR); Jong-Min Shin, Busan (KR); Deok-Hyun Youn, Gimhae-shi (KR); Jae-Hyun Soh, Paju-shi (KR); Cheol-Hwan Kim, Changwon-shi (KR); Won-Young Chung, Changwon-shi (KR); Hoon-Bong Lee, Changwon-shi (KR)

(73) Assignee: LG Electronics Inc., Seoul (KR)

( * ) Notice: Subject to any disclaimer, the term of this patent is extended or adjusted under 35 U.S.C. 154(b) by 946 days.

(21) Appl. No.: 12/673,959

(22) PCT Filed: Mar. 10, 2008

(86) PCT No.: PCT/KR2008/001353
§ 371 (c)(1),
(2), (4) Date: Apr. 16, 2010

(87) PCT Pub. No.: WO2009/035194
PCT Pub. Date: Mar. 19, 2009

(65) Prior Publication Data
US 2010/0199692 A1 Aug. 12, 2010

(30) Foreign Application Priority Data

Sep. 14, 2007 (KR) ........................ 10-2007-0093895

(51) Int. Cl.
*F25C 1/00* (2006.01)

(52) U.S. Cl.
USPC ................................. 62/139; 62/75

(58) Field of Classification Search
USPC .................... 62/62, 73, 125, 135, 66, 75, 139
See application file for complete search history.

(56) References Cited

FOREIGN PATENT DOCUMENTS

| EP | 1 454 541 A1 | 9/2004 |
|---|---|---|
| JP | 2002-364968 A | 12/2002 |
| JP | 3903066 B1 * | 4/2007 |
| JP | 2007-271152 B1 | 10/2007 |

* cited by examiner

*Primary Examiner* — Chen Wen Jiang
(74) *Attorney, Agent, or Firm* — Birch, Stewart, Kolasch & Birch, LLP (57) ABSTRACT

The present invention relates to a supercooling method and a supercooling apparatus which can maintain an object in a supercooled state. According to the present invention, a supercooling method includes a first cooling step of cooling a stored object toward a cooling temperature below a phase transition temperature thereof, a step of judging whether the stored object is released from a supercooled state in the first cooling step, a step of thawing the stored object when the stored object is released from the supercooled state, and a second cooling step of cooling the stored object toward a cooling temperature below zero that is higher than the lowest temperature of the stored object before the release of the supercooled state, wherein the first cooling step is continuously performed when the object is maintained in the supercooled state.

17 Claims, 4 Drawing Sheets

SUPERCOOLING METHOD AND SUPERCOOLING APPARATUS

TECHNICAL FIELD

The present invention relates to a supercooling method and a supercooling apparatus which can maintain an object in a supercooled state, and more particularly, to a supercooling method and a supercooling apparatus which can maintain an object in a supercooled state at an optimum temperature by controlling or adjusting a supercooling temperature of the object.

BACKGROUND ART

Supercooling means a phenomenon where a molten object or a solid cooled to below a phase transition temperature in a balanced state is not changed. A material has stable states by temperatures. If a temperature is slowly changed, elements composing the material keep pace with the temperature variations, maintaining stable states at each temperature. However, if the temperature is sharply changed, the elements can not enter stable states at each temperature. Therefore, the elements maintain a stable state of a start point temperature, or some of the elements fail to enter a state of a final point temperature.

For example, when water is slowly cooled, it is not frozen temporarily below 0° C. However, when an object enters a supercooled state, it has a kind of quasi-stable state. Since such an unstable balanced state is easily broken by slight stimulation, the object tends to be transited into a more stable state. That is, if a small piece of material is put into the supercooled liquid, or if the liquid is suddenly shaken, the liquid is frozen at once, so that a temperature of the liquid reaches a freezing point. The liquid maintains a stable balanced state at the temperature.

In general, foods such as vegetables, fruits, meats and beverages are refrigerated or frozen to be kept fresh. Such foods contain a liquid element such as water. If the liquid element is cooled below a phase transition temperature, it is transited into a solid element at a specific point.

A stored object such as water can be maintained in a supercooled state for a short time. However, in case moisture of food is frozen, the food needs to be maintained in the supercooled state for an extended period of time so as to keep quality and extend a storage period.

The supercooling continuation technology has been applied to an electrostatic field processing method, an electrostatic field processing apparatus, and electrodes therefor in Korean Laid-Open Patent 2000-0011081.

In the conventional art, an electric or magnetic field is applied to a stored cooled object so that the object can enter a supercooled state. A complicate apparatus for generating the electric or magnetic field is required to maintain the stored object in the supercooled state. In addition, power consumption considerably increases in the generation of the electric or magnetic field.

Moreover, the apparatus for generating the electric or magnetic field further needs a user safety device (e.g., an electric or magnetic field shielding structure, a cutoff device, etc.) in the generation or cutoff of the electric field or magnetic field due to high power.

DISCLOSURE OF INVENTION

Technical Problem

The present invention is conceived to solve the aforementioned problems in the prior art. An object of the present invention is to provide a supercooling method and a supercooling apparatus which can detect an optimum supercooling temperature of an object stored in a cooled state and maintain the object at the optimum supercooling temperature without using a complicate structure of generating an electric or magnetic field.

Another object of the present invention is to provide a supercooling method and a supercooling apparatus which can maintain an object at an optimum supercooling temperature by adjusting a cooling temperature without having information on a kind of the object.

A further object of the present invention is to provide a supercooling method and a supercooling apparatus which can rapidly detect an optimum supercooling temperature of an object by using information on the object (kind, mass, volume, etc.).

A still further object of the present invention is to provide a supercooling method and a supercooling apparatus which can rapidly thaw an object in release of a supercooled state of the object, and detect an optimum supercooling temperature of the object by using the release of the supercooled state.

A still further object of the present invention is to provide a supercooling method and a supercooling apparatus which can stably continue a supercooled state by cooling an object at a more stable temperature ch ring adjusting the object to a stable supercooling temperature.

A still further object of the present invention is to provide a supercooling method and a supercooling apparatus which can extend a supercooling continuance time of an object by sensing thawing of the object and using a fact that a thawing time is shorter than the supercooling continuance time, even if the object is caused to be frozen airing cooling.

Technical Solution

According to an aspect of the present invention, there is provided a supercooling method, including: a first cooling step of cooling a stored object toward a cooling temperature below a phase transition temperature thereof; a step of judging whether the stored object is released from a supercooled state in the first cooling step; a step of thawing the stored object when the stored object is released from the supercooled state; and a second cooling step of cooling the stored object toward a cooling temperature below zero that is higher than the lowest temperature of the stored object before the release of the supercooled state, wherein the first cooling step is continuously performed when the object is maintained in the supercooled state.

In addition, the supercooling method may include a step of continuously sensing a temperature of the stored object.

Moreover, the cooling temperature of the first cooling step may be dependent upon at least one of a kind, mass and volume of the stored object.

Further, the thawing step may include a step of judging whether the thawing of the stored object is finished, and the second cooling step may be carried out when the thawing of the stored object is finished.

Furthermore, the judging step, the thawing step and the second cooling step may be repeatedly performed.

Still furthermore, a rise width of the cooling temperature may be inversely proportional to a repetition frequency of the judging step, the thawing step and the second cooling step.

Still furthermore, the supercooling method may include a third cooling step of cooling the stored object toward a cooling temperature that is lower than the current cooling temperature and higher than the lowest temperature of the stored object in the previous release of the supercooled state, when the stored object is maintained in the supercooled state over a predetermined time in the judging step succeeding the second cooling step.

Still furthermore, when the stored object is maintained in the supercooled state over a predetermined time in the third cooling step, the cooling step toward the current cooling temperature and the third cooling step may be alternately performed.

Still furthermore, when the stored object is released from the supercooled state in the third cooling step, the thawing step may be performed, and then the cooling step toward the current cooling temperature may be performed.

According to another aspect of the present invention, there is provided a supercooling method, including: a first step of cooling a stored object toward a temperature below a phase transition temperature thereof; a second step of judging whether the stored object starts to be frozen in the first step; a third step of stopping the cooling when it is sensed in the second step that the stored object starts to be frozen; and a fourth step of raising a temperature of the stored object to a temperature of stopping the freezing of the stored object in a state where the cooling is stopped, wherein the first to fourth steps are sequentially performed again.

According to a further aspect of the present invention, there is provided a supercooling method, including: a first step of cooling a stored object toward a temperature below a phase transition temperature thereof; a second step of sensing a temperature of the stored object in the first step; a third step of comparing the temperature of the stored object with a target temperature according to the temperature fall; a fourth step of stopping the cooling when the temperature of the stored object reaches the target temperature; and a fifth step of raising the temperature of the stored object to a set range temperature higher than the target temperature in a state where the cooling is stopped, wherein the first to fifth steps are performed again, when the temperature of the stored object reaches the set range temperature higher than the target temperature.

According to a still further aspect of the present invention, there is provided a supercooling apparatus, including: a cooling unit for cooling a stored object toward a temperature below a phase transition temperature thereof; a sensing unit for sensing a state of the stored object and judging whether the stored object starts to be frozen; and a control means for stopping the cooling of the cooling unit and raising a temperature of the stored object to a temperature of stopping the freezing of the stored object, when the sensing unit judges that the stored object starts to be frozen.

According to a still further aspect of the present invention, there is provided a supercooling apparatus, including: a cooling means for cooling a stored object; a temperature sensing unit for sensing a temperature of the stored object; a driving unit for raising the temperature of the stored object; and a temperature control unit for receiving the temperature of the stored object from the temperature sensing unit, controlling the cooling means to maintain the stored object in a supercooled state below a phase transition temperature, controlling the driving unit to thaw the stored object in release of the supercooled state of the stored object, and controlling the cooling means after the thawing to cool the stored object toward a temperature below zero that is higher than the lowest temperature of the stored object before the release of the supercooled state.

According to a still further aspect of the present invention, there is provided a supercooling apparatus, including: a cooling means for cooling a stored object; a sensing unit for sensing a temperature of the stored object; a setting unit for setting a target supercooling temperature of the stored object, and a variable temperature, below zero that is higher than the target supercooling temperature; and a temperature control unit for controlling the cooling means to cool the stored object so that the temperature of the stored object from the sensing unit can be maintained between the target supercooling temperature and the variable temperature.

Advantageous Effects

According to the present invention, a supercooling method and a supercooling apparatus can detect an optimum supercooling temperature of an object stored in a cooled state, and freshly maintain the object for an extended period of time without using a complicate structure of generating an electric or magnetic field.

In addition, according to the present invention, a supercooling method and a supercooling apparatus can maintain an object at an optimum supercooling temperature by adjusting a cooling temperature without having information on a kind of the object. Therefore, the object can be maintained in a supercooled state by means of a simple supercooling method.

Moreover, according to the present invention, a supercooling method and a supercooling apparatus can rapidly detect an optimum supercooling temperature of an object by using information on the object (kind, mass, volume, etc.) and minimize reduction of freshness and quality of the object.

Further, according to the present invention, a supercooling method and a supercooling apparatus can rapidly thaw an object in release of a supercooled state of the object, and detect an optimum supercooling temperature of the object by using the release of the supercooled state.

Furthermore, according to the present invention, a supercooling method and a supercooling apparatus can stably maintain an unstable supercooled state by cooling an object at a more stable temperature during adjusting the object to a stable supercooling temperature.

Still furthermore, according to the present invention, a supercooling method and a supercooling apparatus can extend a supercooling continuance time of an object to keep the object fresh, by sensing thawing of the object and using a fact that a thawing time is shorter than the supercooling continuance time, even if the object is caused to be frozen during cooling.

MODE FOR THE INVENTION

Hereinafter, preferred embodiments of the present invention will be described in detail with reference to the accompanying drawings.

Figure 1:
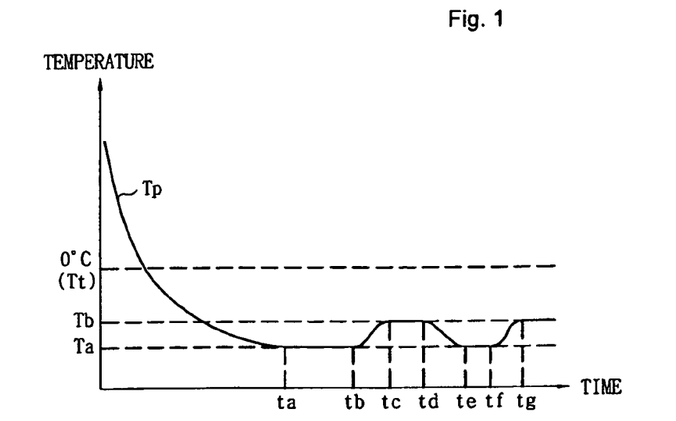
FIG. 1 is a graph showing temperatures in a supercooling method according to a first embodiment of the present invention.

FIG. 1 is a graph showing temperatures in a supercooling method according to a first embodiment of the present invention. Tp denotes a temperature of an object, Tt denotes a phase transition temperature of the object (0° C. in case of water) and Ta denotes a target temperature that is an optimum or stable supercooling temperature set according to information on the object (kind, mass, volume, etc.) or applicable to all objects. However, since the object may be released from a supercooled state at the target temperature Ta, the object is alternately supercooled at a temperature Tb higher than the target temperature Ta to be stably maintained in the supercooled state. Here, (Tb=Ta+ΔT). Tb represents a temperature of stably reliably maintaining the supercooled state, which is lower than the phase transition temperature Tt.

The object is cooled toward the target temperature Ta or the arbitrarily fixed target temperature Tb according to the information on the object (kind, mass, volume, etc.) by means of an input of a user or sensing of a sensing unit.

The temperature Tp of the object is continuously sensed. When the temperature Tp of the object reaches the target temperature Ta (ta in FIG. 1) a supercooling apparatus stops the cooling operation. Since the cooling operation is stopped, the temperature Tp of the object rises after a predetermined time.

When the temperature Tp of the object rises to the temperature Tb (tb to tc time period) the object is cooled again. The temperature Tp of the object falls after a predetermined time (tc to td time period). When the temperature Tp of the object reaches the temperature Ta (td to te time period) the cooling is stopped again (te to tf time period). As the process of adjusting the temperature between the target temperatures Ta and Tb is repeated, the object can maintain the cooled state at an optimal supercooling temperature and within a slightly lower temperature range. Accordingly, since the object is supercooled at the optimum supercooling temperature and the approximate temperature, it can be more stably maintained in the supercooled state.

Figure 2:
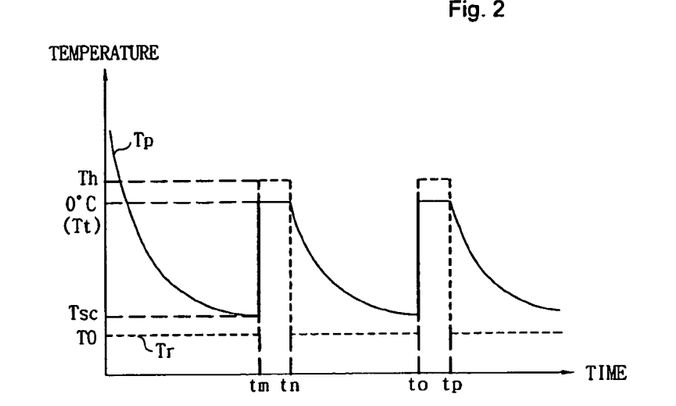
FIG. 2 is a graph showing temperatures in a supercooling method according to a second embodiment of the present invention.

FIG. 2 is a graph showing temperatures in a supercooling method according to a second embodiment of the present invention. Tp and Tt are the same as those of FIG. 1, Th denotes a thawing temperature (equal to or higher than a phase transition temperature of an object) Tr denotes a cooling temperature (a set temperature or inside temperature) in a cooling space storing the object, and Tsc denotes the lowest temperature of the object before (directly before) release of a supercooled state. In the second embodiment, a cooling temperature T0 can be maintained to be constant regardless of a kind of the object. The cooling temperature T0 for forming the supercooled state of the object should be lower than at least the phase transition temperature of the object.

The object is cooled toward the cooling temperature T0. As the time elapses, when the object reaches the lowest temperature of maintaining the supercooled state and is released from the supercooled state (tm in FIG. 2) a sensing unit senses the release of the supercooling. The temperature inside the apparatus is set to be Th and the object is thawed (tm to tn in FIG. 2). After the object is thawed, the temperature inside the apparatus is set to be T0 and the object is cooled again (tn to to in FIG. 2)

As known from the graph of FIG. 2, for example, a thawing time (tm-tn) is considerably shorter than a time of maintaining the object below the phase transition temperature (i.e., a supercooling continuation time; tn-to). That is, in a state where the cooling temperature is not set according to the kind or the like of the object, when the object is cooled toward the fixed temperature T0, the thawing time is shorter than the supercooling continuation time. Therefore, although the object is repeatedly cooled and thawed, the time of maintaining the object in the supercooled state is extended. Accordingly, the object can be freshly maintained in the supercooled state for an extended period of time.

Figure 3:
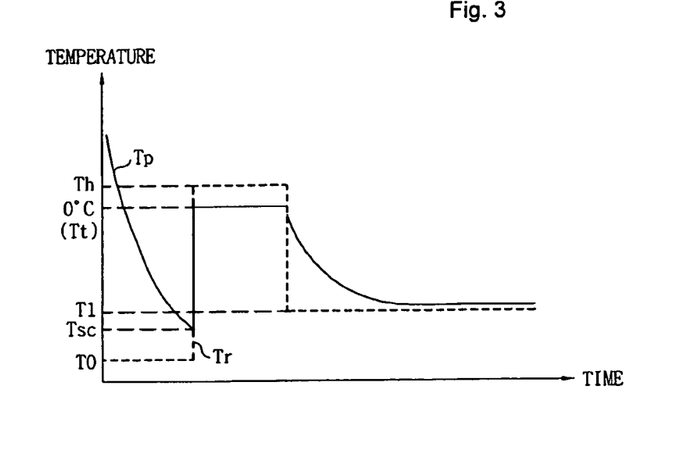
FIG. 3 is a graph showing temperatures in a supercooling method according to a third embodiment of the present invention.
Figure 4:
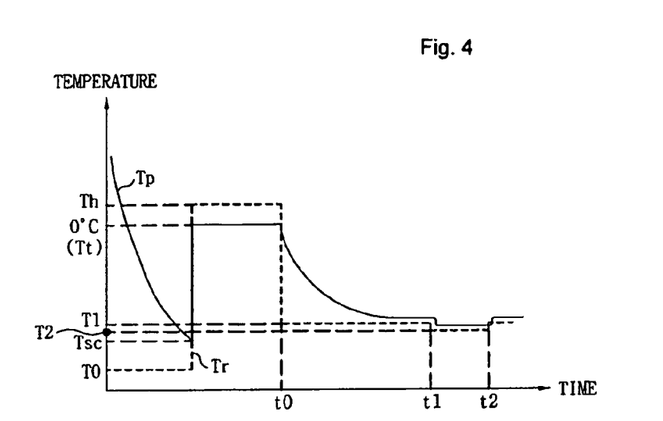
FIG. 4 is a graph showing temperatures in a supercooling method according to a fourth embodiment of the present invention.

FIGS. 3 and 4 are graphs showing temperatures in supercooling methods according to third and fourth embodiments of the present invention.

In the third embodiment of FIG. 3, a cooling temperature (or set temperature) Tr is fixed to a temperature T0 at an initial stage. The initial cooling temperature T0 may be variably set in association with at least one of a kind, mass and volume of an object. For example, the initial set temperature T0 may be differently set with respect to meat, vegetable, beverage, water, etc., and a cooling degree may be differently set according to the mass or volume. Particularly, in a case where information on the object does not exist, the entire objects are identically cooled at a preset temperature.

As the object is continuously cooled, a temperature Tp of the object becomes lower than a phase transition temperature Tt and is approximate to the cooling temperature Tr. Here, when the object maintained in the supercooled state is released from the supercooled state at Tsc, the temperature Tp of the object sharply rises to the phase transition temperature Tt. Whether the object is maintained in the supercooled state or released from the supercooled state can be judged according to variations of the temperature Tp of the object. In a case where the supercooling is not released, the cooling temperature Tr is maintained at the temperature T0.

Here, a supercooling apparatus should thaw the object released from the supercooled state (i.e., the phase-transited object) at a thawing temperature Th where the cooling temperature Tr is over the phase transition temperature Tt.

After the object is thawed, it is cooled again. The cooling temperature Tr should be higher than the cooling temperature T0 in the previous release of the supercooled state. If the object is cooled toward the previous cooling temperature T0, the object may not be maintained in the supercooled state over a predetermined time but released from the supercooled state as in the previous result.

Here, when the cooling temperature Tr is reset, it is preferably set to be a cooling temperature T1 that is higher than the lowest temperature Tsc of the object before the release of the supercooled state of the object. It is because a possibility of maintaining the object in the supercooled state is increased at a temperature higher than the lowest temperature Tsc starting the release of the supercooled state of the object. At this time, a rise width (T1-T0) of the cooling temperature Tr may be fixed regardless of the information on the object or set according to the information on the object.

After the cooling temperature Tr is set to be the temperature T1 and the object is cooled, when the temperature Tp of the object is maintained to be approximate to the temperature T1 over a predetermined time, it is judged that the object is stably maintained in the supercooled state. Therefore, the cooling temperature Tr is maintained at the temperature T1, so that the object can be continuously maintained in the supercooled state.

For example, while the object is cooled at the temperature T1, if the object is released from the supercooled state, the lowest temperature (e.g., Tsc1) of the object before the release of the supercooled state is sensed, the object is thawed again at the thawing temperature Th, and the succeeding cooling temperature Tr is set to be higher than the lowest temperature Tsc1.

If necessary, the processes of judging the release of the supercooled state, thawing the object, and resetting the cooling temperature are repeatedly performed to detect the optimum supercooling temperature of the object.

In the above-described procedure, once the object is released from the supercooled state and frozen, the object should be completely thawed not to be further frozen in the succeeding cooling process. That is, the succeeding cooling process mist be performed in a state where ice crystals or ice crystal cores are all removed from the object. The following methods can be applied to judge whether the thawing of the object is finished.

First, in a case where the object is thawed for or over a thawing time set according to the information of the object (kind, mass, volume, etc.) and a sensed weight (mass) it can be judged that the thawing of the object is finished.

Otherwise, when the object is temporarily cooled to the cooling temperature Tr lower than the phase transition temperature Tt (bring the thawing process, whether the thawing is finished can be judged according to the temperature Tp of the object. That is, when the object is temporarily cooled, if the object has not been completely thawed, the object is further frozen during the cooling, so that the temperature Tp of the object does not fall. However, if the object has been completely thawed, the temperature Tp of the object falls daring the cooling. Accordingly, whether the thawing is finished can be judged according to such temperature variations.

In addition, since the thawing temperature Th is higher than the phase transition temperature Tt of the object during the thawing process, when the thawing is finished, the temperature Tp of the object rises. Therefore, whether the thawing is finished can be judged according to the temperature rise of the object. However, a temperature difference exists between a surface and a deep portion of the object. Preferably, after the temperature Tp of the object rises, the object is further thawed for a predetermined time. Thereafter, the completion of the thawing is judged.

In the fourth embodiment of FIG. 4, since a cooling temperature of cooling an object for the first time is T0, the object is released from a supercooled state, thawed, and cooled again as in FIG. 1. That is, a detected supercooling temperature of the object is a temperature T1.

Here, a temperature difference exists between the lowest temperature Tsc before the release of the supercooled state of the object and the temperature T1. In order to detect an optimum supercooling temperature of the object, cooling is performed toward a cooling temperature T2 between the lowest temperature Tsc and the temperature T1. That is, as shown in FIG. 4, in a case where the object is maintained in the supercooled state at the set cooling temperature T1 over a predetermined time, detected is the cooling temperature T2 of maintaining the object in the supercooled state, which is higher than the lowest temperature Tsc of the object before (directly before) the release of the supercooled state and lower than the temperature T1 of maintaining the object in the supercooled state for a predetermined time.

Still referring to FIG. 4, it is judged that the object is stably maintained in the supercooled state at the temperature T1 in a time point t1 elapsed from a time point t0 of cooling the object toward the temperature T1 by a predetermined time. The predetermined time may be variably set according to information on the object or fixed to a certain time.

In a state where the object is stably maintained in the supercooled state, a fall width T2-T1 of the cooling temperature can be determined similarly to the rise width of the cooling temperature described above.

As shown in FIG. 4, in a case where the object is maintained in the supercooled state at the temperature T2 over a predetermined time, the cooling temperature is raised to the previews stable supercooling temperature T1 at a time point t2 elapsed by a predetermined time. That is, as the object is alternately cooled at the temperatures T1 and T2 of stably maintaining the object in the supercooled state, it is maintained at a lower supercooling temperature. In a case where the object is released from the supercooled state at the temperature T2, it is thawed and then supercooled at the previous cooling temperature T1. The lower or optimum supercooling temperature is detected because the freshness of the object is improved at a lower supercooling temperature in the supercooled state. Moreover, a generation amount of slush is dependent upon the supercooling temperature. Therefore, it is preferable to maintain a temperature as low as possible in the supercooled state. For example, when supercooled liquid becomes slush, as publicly known, an amount of slush generated from low temperature liquid is larger than an amount of slush generated from high temperature liquid.

After the cooling temperature is changed to T2, when the object is not released from the supercooled state within a predetermined time, the above procedure is repeated so that the cooling temperature can be changed to T3 that is lower than T2 and higher than the highest temperature among the temperatures of releasing the supercooling in the previous process. In the same manner, when the object is released from the supercooled state within a predetermined time, the cooling temperature is changed to a temperature that is higher than the temperatures of releasing the supercooling in the previous process and lower than the temperatures of not releasing the supercooled state within a predetermined time.

The cooling temperature can be adjusted to maintain the object at the optimum supercooling temperature by repeating the above procedure.

Figure 5:
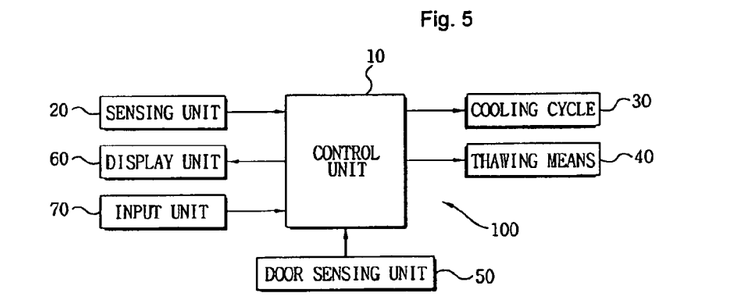
FIG. 5 is a configuration view illustrating a supercooling apparatus performing a supercooling method according to the present invention.

FIG. 5 is a configuration view illustrating a supercooling apparatus performing a supercooling method according to the present invention. A supercooling apparatus 100 includes a control unit 10, a sensing unit 20, a cooling cycle 30, a thawing means 40, a door sensing unit 50, a display unit 60 and an input unit 70. Elements which are not directly associated with the present invention, such as a door and a means for partitioning a storage space, are not illustrated.

The control unit 10 receives information on an object, an execution selection of a supercooling mode by a user, a necessary operation state and the like through the sensing unit 20, the input unit 70 and the door sensing unit 50, and judges the execution or non-execution of the supercooling, variations of Tsc and resulting variations of a cool air supply amount, thereby controlling the cooling cycle 30 and the thawing means 40. In addition, it should be understood that the control unit 10 includes a timer for computing an execution time of the thawing, cooling and the like. Moreover, the control unit 10 includes a storage unit (not shown) for storing information acquired from the sensing unit 20, the input unit 70 and the door sensing unit 50. The storage unit stores a fixed cooling temperature T0 for maintaining the object in the supercooled state, data containing a cooling temperature according to information on the object, a fixed thawing time for thawing the object, or data containing a thawing time according to information on the object. The detailed operation process will be described below.

The sensing unit 20 senses a volume or a mass and a temperature of the object, and a temperature of a cooling space storing the object, and transfers the sensed values to the control unit 10. If necessary, the sensing unit 20 stores the sensed information on the object. According to the sensed result, the control unit 10 can judge whether the object is maintained in or released from the supercooled state. The control unit 10 can confirm a quantity and state of the stored object (object) according to the information from the sensing unit 20, and judge whether to perform thawing or adjust Tsc according to the phase transition. For example, the sensing unit 20 may be a thermometer for sensing a temperature of the cooling space or the liquid, or a hardness meter, a scale, an optical sensor (or laser sensor) or a pressure sensor for judging whether liquid or the like is stored in the storage space or whether liquid is released from the supercooled state, or confirming a kind, volume and mass of liquid or the like.

The cooling cycle 30 for supplying cool air to the cooling space is divided into a direct cooling type and an indirect cooling type. The cooling cycle 30 adjusts an amount or intensity of cool air according to a cooling temperature T0, T1, T2, etc. set by the control unit 10, thereby cooling the cooling space. In addition, the cooling cycle 30 supplies a small amount of cool air or does not supply cool air (bring the thawing process to thereby raise the temperature of the cooling space.

When the control unit 10 is informed of the release of the supercooling by the sensing unit 20, the control unit 10 operates the thawing means 40 to release freezing of the object. The thawing means 40 is a means for supplying energy to release the freezing, e.g., a heater for supplying heat energy. The thawing means 40 and the cooling cycle 30 may perform the thawing process independently or cooperatively.

In a case where an operation of the supercooling apparatus should be changed according to opening and closing thereof, the door sensing unit 50 senses opening and closing by an operation of a door, and notifies the sensed result to the control unit 10.

The display unit 60 can display freezing and refrigerating temperatures of the supercooling apparatus and a service type of a dispenser, and can also display an estimated time to the current supercooled state, execution or cancellation of the supercooled state, etc. Moreover, the display unit 60 can display a continuation time of the supercooled state, an operation inputted by the user, a current temperature or a supercooling temperature of the object, etc.

The input unit 70 basically allows the user to set temperatures for the freezing and refrigerating control and to select the service type (flake ice, water, etc.) of the dispenser, and further allows the user to select the execution of the supercooling mode with respect to the storage space or the stored object and to set the supercooling temperature of the object in the supercooled state. Further, the user can input the information on the object, such as a kind, phase transition temperature and mass of the object, a volume of liquid, etc. by means of the input unit 70. The input unit 70 may be a barcode reader or an RFID reader for supplying the information on the object to the control unit 10.

Figure 6:
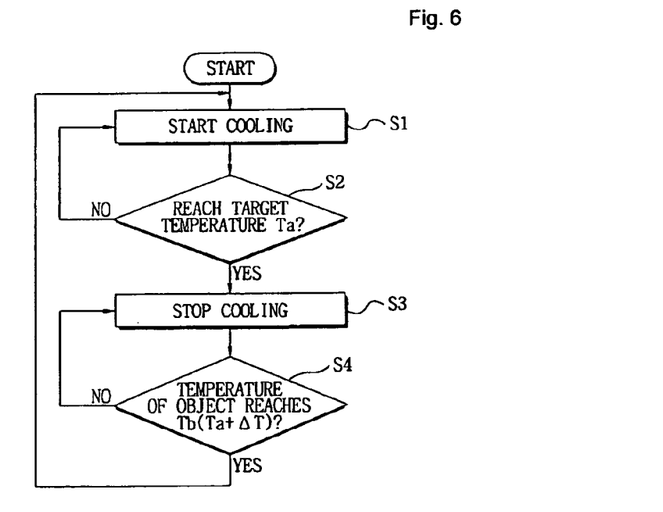
FIG. 6 is a flowchart showing sequential steps of the supercooling method according to the first embodiment of the present invention.

FIG. 6 is a flowchart showing sequential steps of the supercooling method according to the first embodiment of the present invention.

At step S1, an object is stored and cooled. The sensing unit 20 or the door sensing unit 50 judges whether the object is stored. The control unit 10 operates the cooling cycle 30 to cool the object toward a target temperature Ta that is a temperature based on information of the object or an arbitrarily fixed temperature.

At step S1, the target temperature Ta may be set according to information sensed by the sensing unit 20 such as a kind of the stored object, or information inputted through the input unit 70.

At step S2, the control unit 10 judges whether a temperature of the object reaches Ta Wring the cooling of step S1. The sensing unit 20 senses whether the temperature of the object reaches Ta, and the object is cooled until the temperature of the object reaches Ta.

At step S3, since the temperature of the object reaches the optimum temperature Ta, the cooling is stopped. The control unit 10 can stop the cooling by stopping the operation of the cooling cycle 30 or considerably weakening an intensity of supplied cool air.

At step S4, after the cooling is stopped, the temperature of the object rises. The control unit 10 judges whether the temperature of the object reaches Tb (Ta+$\Delta$T) and stops the cooling until the temperature of the object reaches Tb. When the temperature of the object reaches Tb, the routine goes to step S1. The control unit 10 starts the cooling so that the temperature of the object can be Ta. That is, in the supercooling method according to the first embodiment of the present invention, when the temperature of the object reaches Ta, the cooling is stopped until the temperature of the object reaches Tb, and when the temperature of the object reaches Tb, the cooling is performed until the temperature of the object reaches Ta. Such a procedure is repeated.

Figure 7:
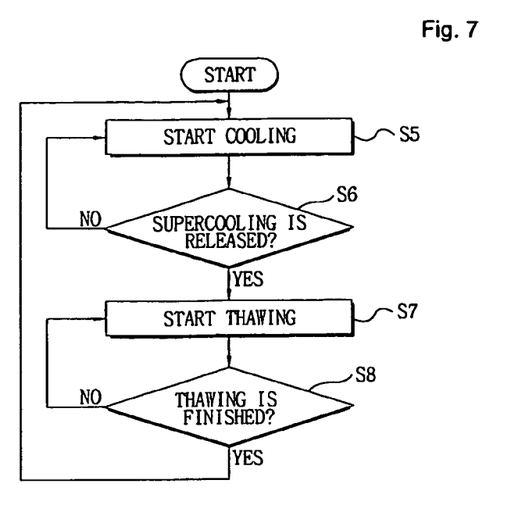
FIG. 7 is a flowchart showing sequential steps of the supercooling method according to the second embodiment of the present invention.

FIG. 7 is a flowchart showing sequential steps of the supercooling method according to the second embodiment of the present invention.

At step S5, an object is stored and cooled. The sensing unit 20 or the door sensing unit 50 judges whether the object is stored. A cooling temperature T0 is fixed, but may be changed according to a kind, volume and mass of the object sensed by the sensing unit 20. The control unit 10 controls the cooling cycle 30 so that a cooling temperature Tr of the storage space can be a temperature T0.

At step S6, as a temperature Tp of the object falls, the control unit 10 judges whether the object is released from the supercooled state. Whether the object is released from the supercooled state, i.e., whether the object is phase-transited can be judged by means of the above-described method.

At step S7, since the object is released from the supercooled state, the object is thawed. The control unit 10 operates the thawing means 40 to thaw the object. Further, the control unit 10 can stop the cooling cycle 30 or weaken an intensity.

At step S8, whether the thawing is finished is judged according to a method of judging a thawing time according to a weight sensed by the sensing unit 20, a method of judging whether the temperature of the object falls in temporary cooling, a method of judging whether the temperature of the object rises during the thawing, and the like. Such judgment standards have been explained above. When the thawing is not finished, the thawing is continued (S7) and when the thawing is finished, the cooling is resumed (S5). That is, in the supercooling method according to the second embodiment of the present invention, the cooling temperature is fixed, and when the object is released from the supercooled state, it is thawed and cooled. Such a procedure is repeated.

Figure 8:
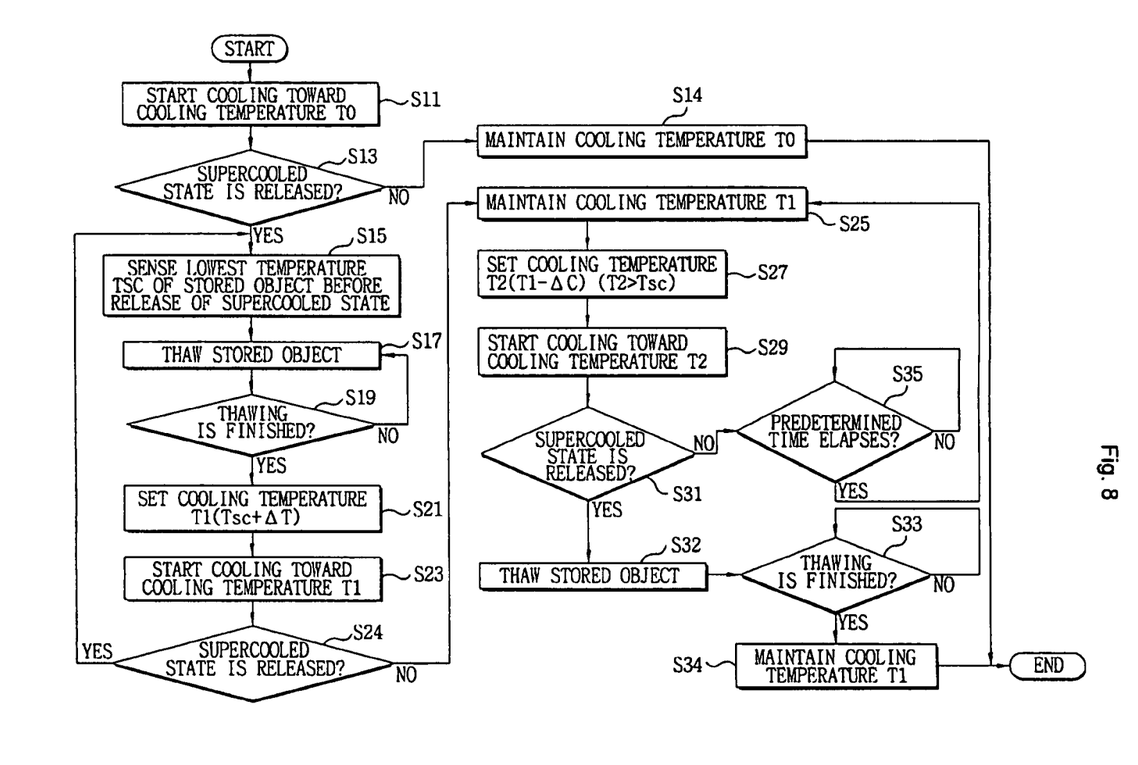
FIG. 8 is a flowchart showing sequential steps of the supercooling methods according to the third and fourth embodiments of the present invention.

FIG. 8 is a flowchart showing sequential steps of the supercooling methods according to the third and fourth embodiments of the present invention. In this embodiment, although a step of sensing a temperature of an object by the sensing unit 20 is not described, the sensing unit 20 can ordinarily sense the temperature of the object as described above.

At step S11, the object is stored and cooled. The sensing unit 20 or the door sensing unit 50 judges whether the object is stored. The control unit 10 receives a kind, mass, volume or the like of the object from the storage unit, the input unit 70 and the sensing unit 20, and judges a cooling temperature T0, or uses a fixed cooling temperature T0.

At step S13, the control unit 10 judges whether the object is released from the supercooled state during the cooling of step S11. The sensing unit 20 senses a sharp temperature variation, a difference in light transmissivity and light reflectance caused by phase transition, and the like, to thereby judge the release of the supercooled state. When the object is released from the supercooled state, the routine goes to step S15. Otherwise, the routine goes to step S14.

At step S14, the control unit 10 can maintain the object in the supercooled state by keeping the cooling temperature T0.

At step S15, the control unit 10 senses the lowest temperature Tsc before the release of the supercooled state. While the supercooling apparatus 100 is driven, the sensing unit transmits a sensed temperature to the control unit 10 at predetermined intervals. Otherwise, the sensing unit 20 receives a sensing command from the control unit 10, senses the temperature of the object in response to the sensing command, and transmits the sensed temperature to the control unit 10. The control unit 10 receives the temperature from the sensing unit 20 and stores the temperature. In a case where the temperature of the object maintained below a temperature of a maximum ice crystal formation zone is changed to be approximate to a phase transition temperature of the object, the control unit 10 judges that the object is released from the supercooled state. Here, the control unit 10 can compare the sensed temperatures stored before the release of the supercooled state, and confirm the lowest temperature of the object before the release as the lowest temperature Tsc.

Here, only one lowest temperature Tsc is stored. That is, when steps S13 to S23 are repeated, only the lowest temperature Tsc in the previcus release of the supercooled state is stored. Otherwise, when steps S13 to S23 are repeated, a higher temperature between the lowest temperature Tsc in the previous release of the supercooled state and Tsc in the previous process may be stored.

At step S17, the object is thawed. The cooling temperature is set to be a thawing temperature Th higher than a phase transition temperature Tt. To this end, energy is applied by the thawing means 40. Normally, a heater for applying heat energy is used as the thawing means 40. Further, supply of cool air using the cooling cycle 30 may be stopped to help the thawing.

At step S19 whether the thawing is finished is judged according to a method of judging a thawing time according to a weight sensed by the sensing unit 20, a method of judging whether the temperature of the object falls in temporary cooling, a method of judging whether the temperature of the object rises during the thawing, and the like. Such judgment standards have been explained above.

At step S21, the cooling temperature is set to be T1. T1 should be higher than Tsc releasing the supercooling by $\Delta T$. Preferably, the more the thawing is carried cut, the smaller $\Delta T$ is. That is, $\Delta T$ may have a fixed value, or may be reduced in inverse proportion to the thawing frequency. As $\Delta T$ is reduced in inverse proportion to the thawing frequency, when steps S13 to S23 are repeated, the temperature can be more approximate to the optimum supercooling temperature of the object.

At step S23, the object is cooled at the reset cooling temperature T1. The control unit 10 adjusts an amount of cool air supplied by the cooling cycle 30 so that the object can be cooled toward T1.

At step S24, the control unit 110 judges whether the object is maintained in the supercooled state during the cooling at the cooling temperature T1. When the object is released from the supercooled state, the routine goes to step S15. At step S15, since the lowest temperature Tsc of the object is the lowest temperature before the previous release of the supercooling, it becomes a temperature sensed at step S23. The cooling temperature T1 at step S21 becomes a reset temperature reflecting the lowest temperature Tsc. When the object is not released from the supercooled state, the routine goes to step S25.

At step S25, when the object is maintained in the supercooled state for a predetermined time, it means that the cooling temperature T1 set at step S13 is maintained.

At step S27, the cooling temperature is changed to T2 that is lower than T1 and higher than the prestored lowest temperature Tsc of the object. AC may have a size based on information of the object or is a fixed value.

At step S28, the control unit 10 cools the object toward the changed cooling temperature. The control unit 10 adjusts an amount of cool air supplied by the cooling cycle 30 so that the object can be cooled toward T2.

At step S31, while the object is cooled toward the cooling temperature T2, whether the object is released from the supercooled state is judged. The method of judging the release of the supercooling using the sensing unit 20 has been explained above.

At step S32, the object is released from the supercooled state. After the object is completely thawed, the cooling temperature is changed to T1 of maintaining the object in the supercooled state for a predetermined time. Thereafter, the routine is ended.

At step S35, the object is not released from the supercooled state. Judged is whether the object is maintained in the supercooled state at T2 for a predetermined time. When the object is maintained in the supercooled state, the routine goes to step S25 to perform the process of lowering the cooling temperature again.

The scope of the present invention is not limited to the embodiments and the drawings, but defined by the appended claims.

The invention claimed is:

1. A supercooling method, comprising:
a first cooling step of cooling a stored object toward a cooling temperature below a phase transition temperature thereof;
a step of judging whether the stored object is released from a supercooled state in the first cooling step;
a step of thawing the stored object when the stored object is released from the supercooled state; and
a second cooling step of cooling the stored object toward a cooling temperature below zero that is higher than the lowest temperature of the stored object before the release of the supercooled state,
wherein the first cooling step is continuously performed when the object is maintained in the supercooled state,
wherein the judging step, the thawing step and the second cooling step are repeatedly performed, wherein a rise width of the cooling temperature is inversely proportional to a repetition frequency of the judging step, the thawing step and the second cooling step, wherein the thawing step comprises a step of temporarily cooling the object to the cooling temperature lower than the phase transition temperature and a step of judging whether the thawing is finished according to the temperature variations of the object during the thawing step, and wherein the second cooling step is carried out when the thawing of the stored object is finished.

2. The supercooling method of claim 1, comprising a step of continuously sensing a temperature of the stored object.

3. The supercooling method of claim 1, wherein the cooling temperature of the first cooling step is dependent upon at least one of a kind, mass and volume of the stored object.

4. The supercooling method of claim 1, wherein when the temperature of the stored object falls during cooling, the completion judgment unit decides the stored object to be completely thawed, and wherein when the temperature of the stored object does not fall, the completion judgment unit decides the stored object to be not completely thawed.

5. A supercooling method, comprising:
a first cooling step of cooling a stored object toward a cooling temperature below a phase transition temperature thereof;
a step of judging whether the stored object is released from a supercooled state in the first cooling step;
a step of thawing the stored object when the stored object is released from the supercooled state; and
a second cooling step of cooling the stored object toward a cooling temperature below zero that is higher than the lowest temperature of the stored object before the release of the supercooled state;
a third cooling step of cooling the stored object toward a cooling temperature that is lower than the current cooling temperature and higher than the lowest temperature of the stored object in the previous release of the supercooled state, when the stored object is maintained in the supercooled state over a predetermined time in the judging step succeeding the second cooling step,
wherein the first cooling step is continuously performed when the object is maintained in the supercooled state, and
wherein the thawing step comprises a step of judging whether the thawing of the stored object is finished, and the second cooling step is carried out when the thawing of the stored object is finished.

6. The supercooling method of claim 5, wherein, when the stored object is maintained in the supercooled state over a predetermined time in the third cooling step, the cooling step toward the current cooling temperature and the third cooling step are alternately performed.

7. The supercooling method of claim 5, wherein, when the stored object is released from the supercooled state in the third cooling step, the thawing step is performed, and then the cooling step toward the current cooling temperature is performed.

8. A supercooling method, comprising:
a first step of cooling a stored object toward a temperature below a phase transition temperature thereof;
a second step of judging whether the stored object starts to be frozen in the first step;
a third step of stopping the cooling when it is sensed in the second step that the stored object starts to be frozen; and
a fourth step of thawing the stored object by raising a temperature of the stored object to a temperature of stopping the freezing of the stored object in a state where the cooling is stopped,
wherein the fourth step comprises a step of judging whether the thawing of the stored object is finished, and when the thawing of the stored object is finished,
wherein the first to fourth steps are sequentially performed again, and
wherein the step of judging whether the thawing of the stored object is finished comprises a step of temporarily cooling the object to the cooling temperature lower than the phase transition temperature and a step of judging whether the thawing is finished according to the temperature variations of the object during the thawing step.

9. The supercooling method of claim 8, wherein the second step comprises a step of sensing the temperature of the stored object, and judges whether the stored object starts to be frozen according to temperature variations of the stored object.

10. The supercooling method of claim 8, wherein when the temperature of the stored object falls during cooling, the completion judgment unit decides the stored object to be completely thawed, and
wherein when the temperature of the stored object does not fall, the completion judgment unit decides the stored object to be not completely thawed.

11. A supercooling method, comprising:
a first step of cooling a stored object toward a temperature below a phase transition temperature thereof;
a second step of sensing a temperature of the stored object in the first step; a third step of comparing the temperature of the stored object with a target temperature according to the temperature fall;
a fourth step of stopping the cooling when the temperature of the stored object reaches the target temperature; and
a fifth step of raising the temperature of the stored object to a set range temperature higher than the target temperature in a state where the cooling is stopped,
wherein the first to fifth steps are performed again, when the temperature of the stored object reaches the set range temperature higher than the target temperature.

12. The supercooling method of claim 11, comprising a step of judging whether the stored object starts to be frozen during the execution of the first to fifth steps, wherein, when it is sensed that the stored object starts to be frozen, the step of stopping the cooling and the step of raising the temperature of the object to a temperature of stopping the freezing of the stored object in a state where the cooling is stopped are performed, and the process is resumed from the first step.

13. The supercooling method of claim 11, wherein the set range temperature higher than the target temperature is lower than a phase transition temperature of the stored object.

14. The supercooling method of claim 11, comprising a step of confirming the stored object, and a step of setting a target temperature according to the confirmed stored object.

15. The supercooling method of claim 14, wherein the confirming step confirms at least one of a kind, mass and volume of the stored object.

16. A supercooling apparatus, comprising:
a cooling means for cooling a stored object;
a temperature sensing unit for sensing a temperature of the stored object;
a driving unit for raising the temperature of the stored object; and
a temperature control unit for receiving the temperature of the stored object from the temperature sensing unit, controlling the cooling means to maintain the stored object in a supercooled state below a phase transition temperature, controlling the driving unit to thaw the stored object in release of the supercooled state of the stored object, and controlling the cooling means after the thawing to cool the stored object toward a temperature below zero that is higher than the lowest temperature of the stored object before the release of the supercooled state, wherein the temperature control unit comprises a completion judgment unit for judging whether the thawing of the stored object is finished, wherein the temperature control unit temporarily cools the object to the cooling temperature lower than the phase transition temperature, and wherein the completion judgment unit judges whether the thawing is finished according to the temperature variations of the stored object.

17. The supercooling apparatus of claim 16, wherein when the temperature of the stored object falls during cooling, the completion judgment unit decides the stored object to be completely thawed, and wherein when the temperature of the stored object does not fall, the completion judgment unit decides the stored object to be not completely thawed.

* * * * *